United States Patent
Malaczynski et al.

(10) Patent No.: US 6,805,099 B2
(45) Date of Patent: Oct. 19, 2004

(54) WAVELET-BASED ARTIFICIAL NEURAL NET COMBUSTION SENSING

(75) Inventors: Gerard Wladyslaw Malaczynski, Bloomfield Hills, MI (US); Michael Edward Baker, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 90 days.

(21) Appl. No.: 10/286,619

(22) Filed: Oct. 31, 2002

(65) Prior Publication Data

US 2004/0084024 A1 May 6, 2004

(51) Int. Cl.$^7$ .................................................. F02M 7/00
(52) U.S. Cl. ..................... 123/435; 701/106; 73/35.08; 123/406.22; 123/406.41
(58) Field of Search ....................... 123/406.22, 406.26, 123/406.41, 406.42, 406.43, 435; 701/106; 73/35.08

(56) References Cited

U.S. PATENT DOCUMENTS

| | | | |
|---|---|---|---|
| 4,257,373 A * | 3/1981 | McDougal et al. | 123/406.2 |
| 4,471,737 A * | 9/1984 | McDougal et al. | 123/406.26 |
| 5,029,567 A * | 7/1991 | McDougal et al. | 123/406.21 |
| 5,133,322 A * | 7/1992 | McDougal et al. | 123/406.21 |
| 5,207,200 A | 5/1993 | Iwata | |
| 5,483,818 A * | 1/1996 | Brandt et al. | 73/35.01 |
| 5,676,113 A | 10/1997 | Johansson et al. | |
| 5,687,082 A | 11/1997 | Rizzoni | |
| 5,769,049 A | 6/1998 | Nytomt et al. | |
| 5,778,855 A * | 7/1998 | Czekala et al. | 123/406.27 |
| 6,367,462 B1 * | 4/2002 | McKay et al. | 123/568.21 |

* cited by examiner

*Primary Examiner*—John Kwon
(74) *Attorney, Agent, or Firm*—Jimmy L. Funke (57) ABSTRACT

A method and apparatus for real-time measurement of combustion characteristics of each combustion event in each individual cylinder coupled with an ability to control the engine based upon the combustion characteristics are shown. The invention includes using selective sampling techniques and wavelet transforms to extract a critical signal feature from an ionization signal that is generated by an in-cylinder ion sensor, and then feeds that critical signal feature into an artificial neural network to determine a desired combustion characteristic of the combustion event. The desired combustion characteristic of the combustion event includes a location of peak pressure, an air/fuel ratio, or a percentage of mass-fraction burned, among others. The control system of the engine is then operable to control the engine based upon the combustion characteristic.

23 Claims, 4 Drawing Sheets

WAVELET-BASED ARTIFICIAL NEURAL NET COMBUSTION SENSING

TECHNICAL FIELD

This invention pertains generally to internal combustion engine control systems, and more specifically to real-time digital signal processing for engine control and diagnostics.

INCORPORATION BY REFERENCE

Applicant incorporates by reference U.S. Pat. No. 6,367, 462, entitled Engine Torque Management Method with High Dilution EGR Control, issued to McKay, et al., in that the method for engine torque management need not be fully described in detail herein.

BACKGROUND OF THE INVENTION

Figure 4:
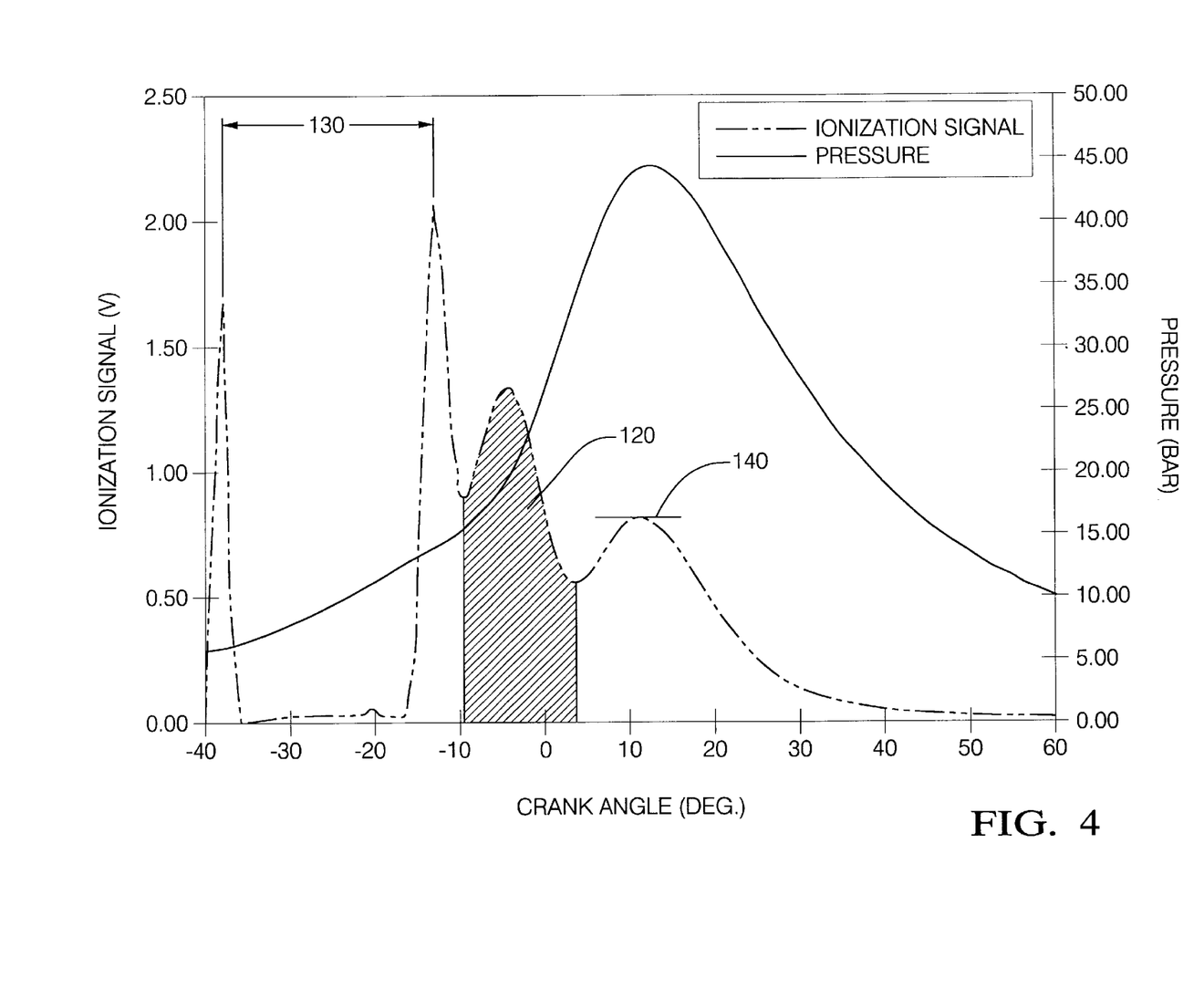
FIG. 4 is a graphical representation of data, in accordance with the present invention.

There is a need to be able to effectively collect and analyze data related to combustion characteristics of an internal combustion engine and to control the engine based upon that data. Current engine control systems use exhaust gas sensors, primarily oxygen sensors, to provide feedback about the overall combustion operation of the engine. Other feedback devices that have been proposed for engine control systems include in-cylinder pressure sensors and in-cylinder temperature sensors A combustion quality measurement technique utilizing flame ionization detection wherein a spark plug is also used as a sensor has been in production for some time. The ionization signal is a measure of changes in electrical conductivity of a combustion flame front that is created in a cylinder during each combustion cycle. As shown in FIG. 4, information that is gleaned from an ionization signal includes location of a peak combustion pressure, air to fuel ratio, or percentage of mass fraction burned. Present versions of the sensor and measurement system are currently used for control and diagnostic purposes. These systems include detection and control of charge pre-ignition or 'knock', detection of engine misfire, and control of cam phasing systems.

The ability to use an ionization signal for engine control is limited by the ability to glean critical signal features from the signal. Fluctuations in the ionization signal caused by variations within an engine, engine to engine variations, and external factors have made more complete interpretation and utilization of the ionization signal difficult. Variations within an engine that affect the combustion process include engine operating temperature, cylinder-to-cylinder maldistribution of air, fuel, and EGR, spark timing and energy, and the age and level of deterioration of the components, among others. Variations between engines that affect the combustion process, and hence the ionization current, include part-to-part differences, vehicle application differences, and operator usage differences, and component age. Variations in external factors that affect the combustion process include in-use fuel type, use of fuel additives, ambient air humidity, ambient temperature, and elevation. These factors, among others, make it difficult to perform a straightforward interpretation of an ionization signal created as an output of the combustion process.

The prior art has been unable to accomplish demonstrable advanced engine control and engine diagnostic capability using information from an ionization signal. The prior art has been unable to provide real-time signal processing that leads to information related to critical signal features such as the location of peak pressure, air to fuel ratio, or percentage of mass fraction burned, when measured over a wide range of engine operating conditions. The prior art has not been robust to changes in conditions that affect measured engine operating conditions, including external conditions such as fuel quality and ambient temperature. The prior art also has not been robust to changes in operating conditions such as engine operating temperature and variations in in-cylinder temperatures.

There is a need to be able to more completely determine combustion characteristics from an ionization signal to make it useful as a system for combustion control. Conventional analytical methods have not provided a level of robustness necessary for mass production application of an ionization system. The prior art has attempted to solve the problem using artificial neural networks (ANN) for analytical interpretation of ionization signals. A properly trained ANN-based ionization sensor and system has been shown to be able to accommodate combustion fluctuations. A comprehensive training of the ANN that covered a broad range of possible engine operating conditions has enhanced performance of an engine control system. A limitation of artificial intelligence is that an ANN device only knows what it was taught; it can not extrapolate beyond the range of its training, nor can it perform any better than it was taught during training. Training of the ANN also consumes time both to collect appropriate data sets for training, and to train so that it can acquire effective coefficients and biases for internal equations. The ANN also takes an amount of time to process the input array and provide an output. An ANN works effectively only if the pre-production algorithm formulation and ANN training resulted from an experimental data set representing all future engine operating conditions. In practice, this might be impossible or at least extremely time and resource consuming. A reasonable solution can instead include a limited training with well chosen, most-representative sets of operating conditions. This can be combined with a fuzzy logic block that overrules unusual sensor readings to control an engine.

The prior art has implemented ANN using a dedicated digital signal processing (DSP) electronic chip implemented in the controller, as well as using algorithms. Dedicated ANN DSP chips can be costly, and are generally dedicated to a specific application, which limits the flexibility of the device, and makes the operating characteristics of the ANN difficult to change.

The prior art has also sought to use statistical analysis tools such as principal component analysis (PCA). The PCA method generates a new set of input vector components from a linear combination of original vector components. All the new components are orthogonal to each other so there is no redundant information. However, it is commonplace for the sum of the variances of the first few new components to almost match the total variance of the components of the original vector. The PCA method entails the need to collect and process massive amounts of data to extract useful information from the input signal. The PCA method requires acquisition of a large quantity of data (vector array of 123 input elements in one case), and takes an extended amount of time to reduce to a useful signal. This limits the throughput of the controller, and therefore the dynamic range over which the method is used to control a system.

Accordingly, a need exists for a more complete method to analyze the input from an ionization signal, to extract critical signal features from the ionization signal, to determine combustion characteristics from the critical signal features, and to control an internal combustion engine over a wide range of operating conditions, using the combustion characteristics. There is a further need to have data acquisition hardware and a controller that are flexible and meet the requirements for an automotive microprocessor system. Implementation of an engine control system that determines a combustion characteristic based upon an ionization signal can offer improvements in engine control and diagnostics, including an ability to extract critical signal features including a location of peak cylinder pressure, air/fuel ratio, and EGR dilution fraction, among others. A system that analyzes input from an ionization signal obtained through an in-cylinder plug can be used to reduce engine development and calibration time as well as provide opportunities to remove or redesign components such as knock sensors, exhaust gas sensors, cam sensors, and others.

SUMMARY OF THE INVENTION

The present invention provides an improvement over conventional engine controls in that it provides a method and apparatus for real-time measurement of combustion characteristics of each combustion event in each individual cylinder coupled with an ability to control the engine based upon the combustion characteristics. The invention includes using selective sampling techniques and wavelet transforms to extract a critical signal feature from an ionization signal that is generated by an in-cylinder ion sensor, and then feeds that critical signal feature into an artificial neural network to determine a desired combustion characteristic of the combustion event. The desired combustion characteristic of the combustion event includes a location of peak pressure, an air/fuel ratio, or a percentage of mass-fraction burned, among others. The control system of the engine is then operable to control the engine based upon the combustion characteristic. This includes control of engine torque, and more specifically fuel injection, exhaust gas recirculation, cam timing and phasing, as well as other engine control elements. This also includes spark timing and dwell when the engine is a spark-ignition engine.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
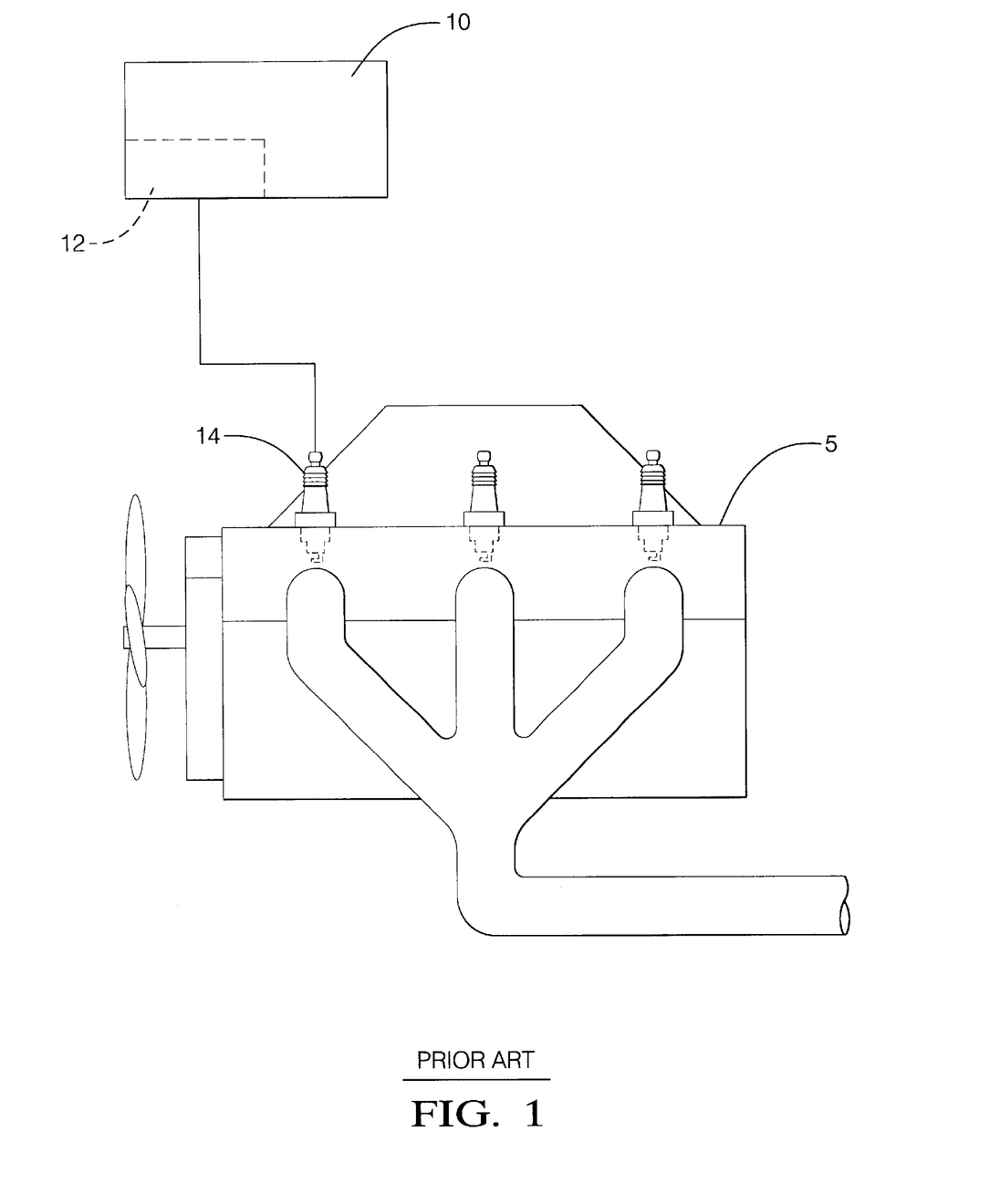
FIG. 1 is a descriptive view of an engine and control system, in accordance with the present invention.

Referring now to the drawings, wherein the showings are for the purpose of illustrating the preferred embodiment of the invention only and not for the purpose of limiting the same, FIG. 1 shows an internal combustion engine 5 and controller 10 which have been constructed in accordance with an embodiment of the present invention. In this embodiment, the internal combustion engine is a spark-ignition engine. The internal combustion engine 5 is comprised of at least one cylinder containing a piston that is operably attached to a crankshaft at a point that is eccentric to an axis of rotation of the crankshaft. There is a head at the top of the piston containing valves for intake and exhaust air and a spark plug. A combustion chamber is formed within the cylinder between the piston and the head. A combustion charge comprising a combination of air and fuel is inlet through the intake valve into the combustion chamber, and is ignited by the spark plug, according to predetermined conditions. The ignition of the air and fuel causes an increase in pressure in the combustion chamber, which forces the piston to move linearly along the length of the cylinder, away from the head. The movement of the piston in turn causes the crankshaft to rotate. The crankshaft causes the piston to again move toward the head after the crankshaft has rotated to a furthest point of eccentricity. The operation of a spark-ignition internal combustion engine is well known to one skilled in the art.

The internal combustion engine 5 is configured with sensors that are operable to measure engine performance, and output devices that are operable to control engine performance. The sensors may include, for example, an engine speed sensor, a manifold absolute pressure sensor, a throttle position sensor, a mass air flow sensor, an intake air sensor, an EGR position sensor, an exhaust pressure sensor, an oxygen sensor or other exhaust gas sensor, torque sensor, a combustion sensor, or a cam position sensor (not shown). The engine speed sensor is used to determine engine rotational speed; the manifold absolute pressure sensor, the throttle position sensor, the intake air temperature sensor, and the mass air flow sensor is used to determine engine load; and the EGR position sensor is used in conjunction with the manifold absolute pressure sensor to determine a mass fraction of EGR that is delivered to the engine. The output devices may include, for example, a fuel injection system, a spark ignition system, an electronic throttle control system, an exhaust gas recirculation system, an evaporative control system, or a variable cam phasing system (not shown). The controller 10 collects information from the sensors to determine engine performance parameters and controls the output devices, using control algorithms and calibrations internal to the controller 10.

Alternatively, the controller 10 may be operably connected to at least one sensor and an engine torque management system (as described in U.S. Pat. No. 6,367,462, entitled Engine Torque Management Method with High Dilution EGR Control, issued to McKay, et al., and is incorporated by reference herewith). The engine torque management system may comprise a fuel injection system, an ignition system, an electronic throttle control system, an exhaust gas recirculation system, an evaporative control system, and a variable cam phasing system (not shown). The sensors are those as described previously. The controller 10 controls the engine torque management system based upon input from the sensor. Mechanization and operation of an internal combustion engine using sensors, output devices, and the controller 10 is well known to one skilled the art.

The spark ignition system of this embodiment comprises the spark plug 14 and ignition coil (not shown) that are electrically connected to an ion sense ignition module 12 that is preferably operably integrated into the controller 10. The spark plug 14 serves dual functions. It is operable to ignite a combustion charge in a cylinder (not shown) when a spark control signal is sent from the controller 10 through the ion sense ignition module 12. It is also operable to sense an ionization signal resulting from the ignition of a combustion charge. A combustion event is defined by the action of the intake of an air/fuel charge into the cylinder (not shown), compressing the charge, igniting the charge to extract power from the charge, and finally the exhaust of the charge from the cylinder. The ion-sense ignition system mechanization and operation, and the combustion process are well known to one skilled in the art.

The engine control system is preferably configured in such a manner that the controller 10 samples an ionization signal (see FIG. 4) from each combustion event of the engine 5 using the spark plug 14 and the ion-sense ignition module 12. The controller 10 samples the ionization signal and concurrently determines specific engine operating parameters, using the engine sensors (not shown) and the spark plug 14 mentioned previously. The controller 10 then transforms the ionization signal with a wavelet filter 24. The transformed ionization signal that is output from the wavelet filter 24 is passed through a feature extractor 28, which operates to extract one or more critical signal features from the ionization signal. The controller 10 then processes the critical signal features and the engine operating parameters through an artificial neural network 32 to determine a combustion characteristic of the engine 5. The combustion characteristic is determined each combustion event. The controller 10 then controls the output devices of the internal combustion engine 5 based upon the combustion characteristic that was determined using the neural network 32.

Figure 2:
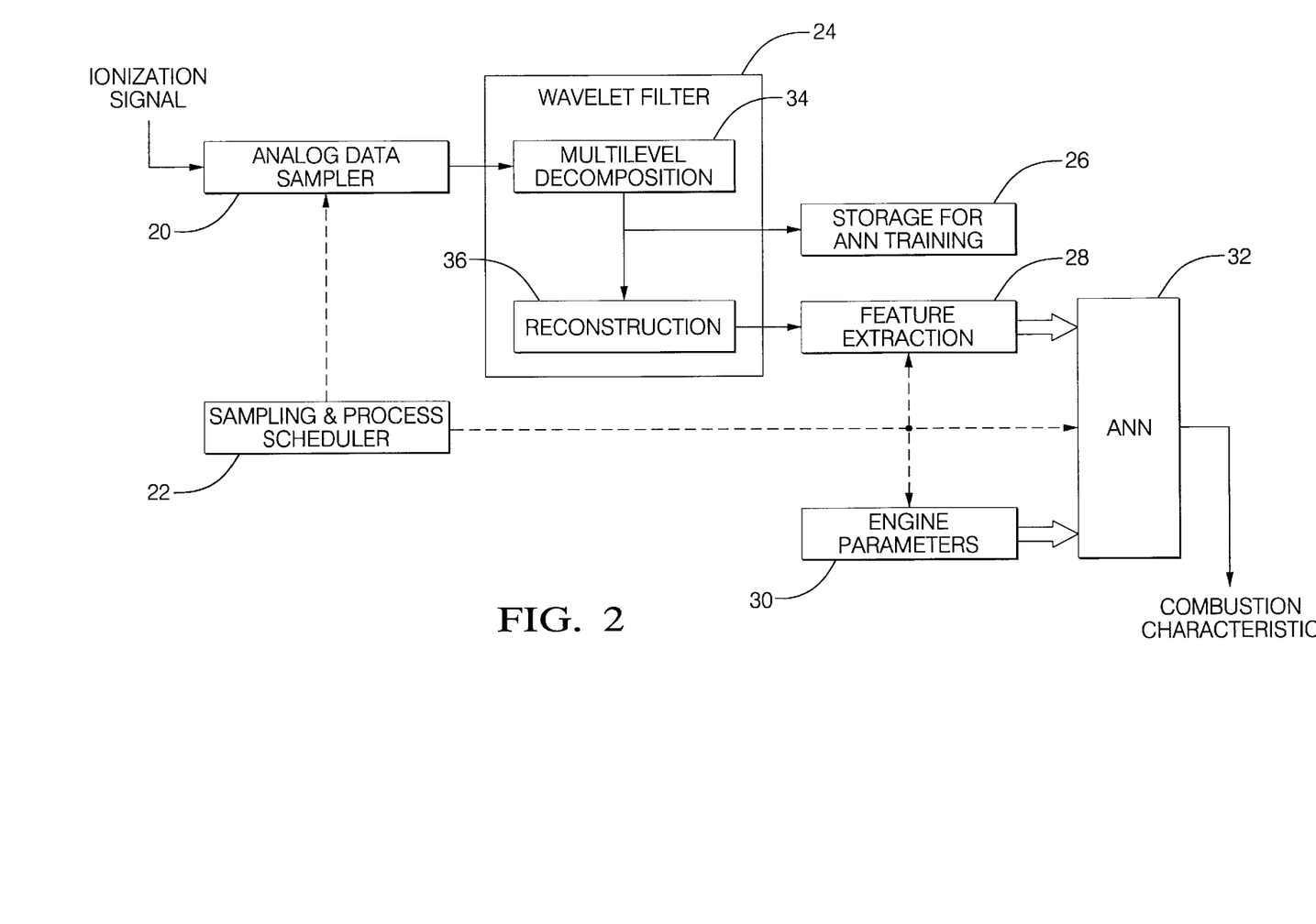
FIG. 2 is a functional block diagram, in accordance with the present invention.

Referring now to FIG. 2, a block diagram of an embodiment of method and system for wavelet-based artificial neural net combustion sensing is shown. This embodiment represents the functional implementation of the wavelet-based artificial neural net combustion sensing system that is configured in the controller 10 in the form of algorithms and calibrations. There is an analog data sampler 20 that gathers data from the ionization signal that comes from each spark plug 14. There is a sampling and processing scheduler 22 that causes the analog data sampler 20 to concurrently take data from the ionization signal and various engine sensors (not shown) to determine engine operating parameters. This data is used to operate a feature extraction mode, and also to operate the artificial neural net 32. An output of the analog data sampler 20 is a digitized signal of the ionization signal and is provided as input to a wavelet filter 24, which conducts a multilevel decomposition of the output of the analog data sampler 20 and an accompanying reconstruction of the signal, as shown in blocks 34, 36. The output of the multilevel decomposition block 34 is compressed and stored for training of the artificial neural net 32, as shown in block 26. An output of the reconstruction block 36 is input to the feature extractor 28, which acts to extract one or more critical signal features from the ionization signal that has been transformed by the wavelet filter 24. The engine operating parameters 30 and the critical signal features of the ionization signal are input to the artificial neural net 32. An output of the artificial neural net 32 is a combustion characteristic of the engine, which is used by the controller 10 to control the engine 5.

The analog data sampler 20 captures a data sample from the ionization signal that comes from the spark plug 14. Sampling of the ionization signal is scheduled to focus on an initial phase of combustion process in order to extract information that is related to a specific combustion characteristic. This is shown in FIG. 4. The sampling and processing scheduler 22 causes the analog data sampler 20 to sample the ionization signal during the period of time immediately after a spark ignition event, e.g. for 50 elapsed degrees of angular rotation of the crankshaft (not shown) after each spark ignition event (see item 130 of FIG. 4). The preferred sampling rate is to sample the ionization signal at least once per 0.5 degrees of rotation of the crankshaft (not shown) for each combustion event.

The data sample that is taken from the ionization signal is input to an analog/digital converter (not shown) in the analog data sampler 20. The data sample is digitized and becomes an input to the wavelet filter 24. The sampling and processing scheduler 22 also causes the engine operating parameters to be captured concurrently with the data sample. The engine operating parameters preferably include engine rotational speed, engine load, engine operating temperature, spark ignition advance, and intended EGR mass-fraction, and is determined by the controller 10, as described previously. This data is used in conjunction with the feature extractor 28 and operation of the artificial neural net 32.

The wavelet filter 24 is a mathematical transform that recognizes critical signal features in the data sample, based upon principles of shaping and scaling. The feature extractor 28 extracts the critical signal features from the data sample that has been transformed by the wavelet filter 24. A wavelet is defined as a waveform of limited duration that has an average value of zero. A section of a sine wave can be characterized using a wavelet. An ionization signal from an ion sensor, i.e. a spark plug, can also be characterized using a wavelet. The extracted patterns may not be readily identified in the original data sample due to noise. Each wavelet filter 24 and feature extractor 28 is specially tuned to identify and extract a specific critical signal feature from the data sample. Extracting a critical signal feature comprises quantifying the critical signal feature in units of measure. A specific critical signal feature includes a spike in the signal or a first or a second peak value. Critical signal features related to an ionization signal are shown in FIG. 4, and include, for example, a second peak pressure 140, measured in units of Pascals or Bar, and an integrated flame phase 120, measured in units of volt-seconds, or volts-crank-angle degrees. Tuning of a wavelet filter and a feature extractor to identify and extract a specific critical signal feature from a data sample is known to one skilled in the art.

The complete wavelet filter 24 is comprised of a multi-level decomposition segment 34 and a corresponding multilevel reconstruction segment 36. The multilevel decomposition segment 34 is comprised of a series of digital filters that are executed as algorithms in the controller 10. A wavelet transform decomposes the data sample in the decomposition segment 34, compresses the data sample, and then reconstructs the data sample in the reconstruction segment 36 for recognition and extraction of a signal in the wavelet, using the feature extractor 28.

The decomposition and reconstruction segments 34, 36 are comprised of high pass and low pass digital filter legs. The decomposition segment 34 may be comprised of both a high pass filter leg and a low pass filter leg. Alternatively, the decomposition segment 34 may be comprised of only the high pass filter leg or only the low pass filter leg, depending upon the signal feature to be extracted. For example, using only a low pass filter leg for decomposition 34 followed by reconstruction 36 allows for selective extraction of a low-frequency signal that is not necessarily periodic.

The high pass filter leg divides the input to provide a detail content of the data sample. The high pass filter leg is a series of high pass digital filters wherein the initial input is a digitized representation of the data sample from the ion sensor and each output of a filter becomes the input to a subsequent filter. Each high pass filter generates a differential of the adjacent input signals using the equation:

$$DIFF = constantA * [s(N+1) - s(N)]/2$$

wherein constantA represents a predetermined coefficient based upon tuning of the wavelet filter, N represents a count in the digital signal sequence, i.e. time or angular position, and s(N) represents the signal from the data sample at N. In this embodiment, a preferred value for N is 0.5 degrees of angular rotation of the crankshaft (not shown). S(N) is a measure of current in microamperes at the specific position N, as determined by the ion-sense ignition module 12. The predetermined coefficient constantA may vary for each subsequent digital filter. The predetermined coefficient constantA is defined by the specific type of wavelet filter that has been selected and the tuning associated therewith.

The low pass filter leg divides the input to provide an approximation content of the wavelet. The low pass filter leg is a series of low pass filters wherein the input is the aforementioned wavelet, and each output of a filter becomes the input to a subsequent filter. Each low pass filter generates an average of the adjacent input signals using the equation:

$$AVG = constantD * [s(N+1) + s(N)]/2$$

wherein constantD represents a predetermined coefficient based upon tuning of the wavelet filter, N represents count in the digital signal sequence, i.e. time or angular position, and s(N) represents the signal from the data sample at N. Again, in this embodiment a preferred value for N is 0.5 degrees of angular rotation of the crankshaft (not shown). S(N) is a measure of current in microamperes at the specific position N, as determined by the ion-sense ignition module 12. The predetermined coefficient constantD may vary for each subsequent digital filter. The predetermined coefficient constantD is also defined by the specific type of wavelet transform filter that has been selected and the tuning associated therewith.

Reconstruction (block 36) of the ionization signal occurs by reassembling each digital filter in a reverse order of the decomposition segment. The output of the reconstruction is a full recovery of the critical signal feature with unwanted noise eliminated, which is then passed through the feature extractor 28. The extracted signal is then input to the artificial neural network 32 for further analysis and subsequent use by the controller 10.

Portions of both the approximation content and the detail content are retained or discarded, which serves to enhance the critical signal feature for later extraction during feature extraction, shown in block 28. In block 28, the feature extractor acts to extract critical signal features in the form of the detail content obtained from the data sample using the high pass filter leg of the wavelet filter 24. This includes extracting a discontinuity such as a spike, and comprises the shape and time of occurrence of the spike. The feature extractor 28 also extracts critical signal features in the form of the approximation content obtained from the data sample using the low pass filter leg of the wavelet filter 24. This includes extracting a curve shape description that may include the amplitude, frequency, and points of inflection. The use of wavelet filters and feature extractors to extract a critical signal feature from a data sample is known to one skilled in the art.

The critical signal features include, for example, a location of peak pressure or an integral of the flame phase. The location of peak pressure is a measure of the rotational position of the crankshaft (not shown) or a measure of elapsed time after the start of a spark event wherein the ionization signal reaches a second peak value, which is also a first peak value in the ionization signal that occurs after the flame phase of the ionization signal (see item 140 of FIG. 4). The location of peak pressure is directly correlated to the location of the peak cylinder pressure, which is used by the controller 10 to determine a magnitude of engine torque and control the engine 5. An integral of the flame phase of the ionization signal is a time-integral of the ionization signal during the flame phase of the combustion event, which is the first peak of the combustion process after the start of spark event. This is shown as item 120 of FIG. 4. The integral of the flame phase is correlated to the instantaneous air/fuel ratio, which is used by the controller 10 to control the engine 5.

As has been described, the output of the reconstruction 36 is input to a feature extractor 28, which acts to extract one or more critical signal features from the ionization signal that has been processed by the wavelet filter 24. The engine operating parameters 30 collected concurrent with the ionization signal, and the critical signal features that are output from the feature extractor 28 become inputs to the ANN 32.

The ANN 32 is a sophisticated nonlinear analytical method used to model complex relationships between an array of data inputs and at least one output. In this embodiment, the array of data inputs is comprised of the critical signal feature and specific engine parameters. The output is the desired combustion characteristic. The ANN 32 is implemented as a series of digital signal processing algorithms in the controller 10. A relationship exists between the known array of data inputs and unknown output, but the exact nature of the relationships between inputs and output is unknown. The array of data inputs generally contain added noise.

Figure 3:
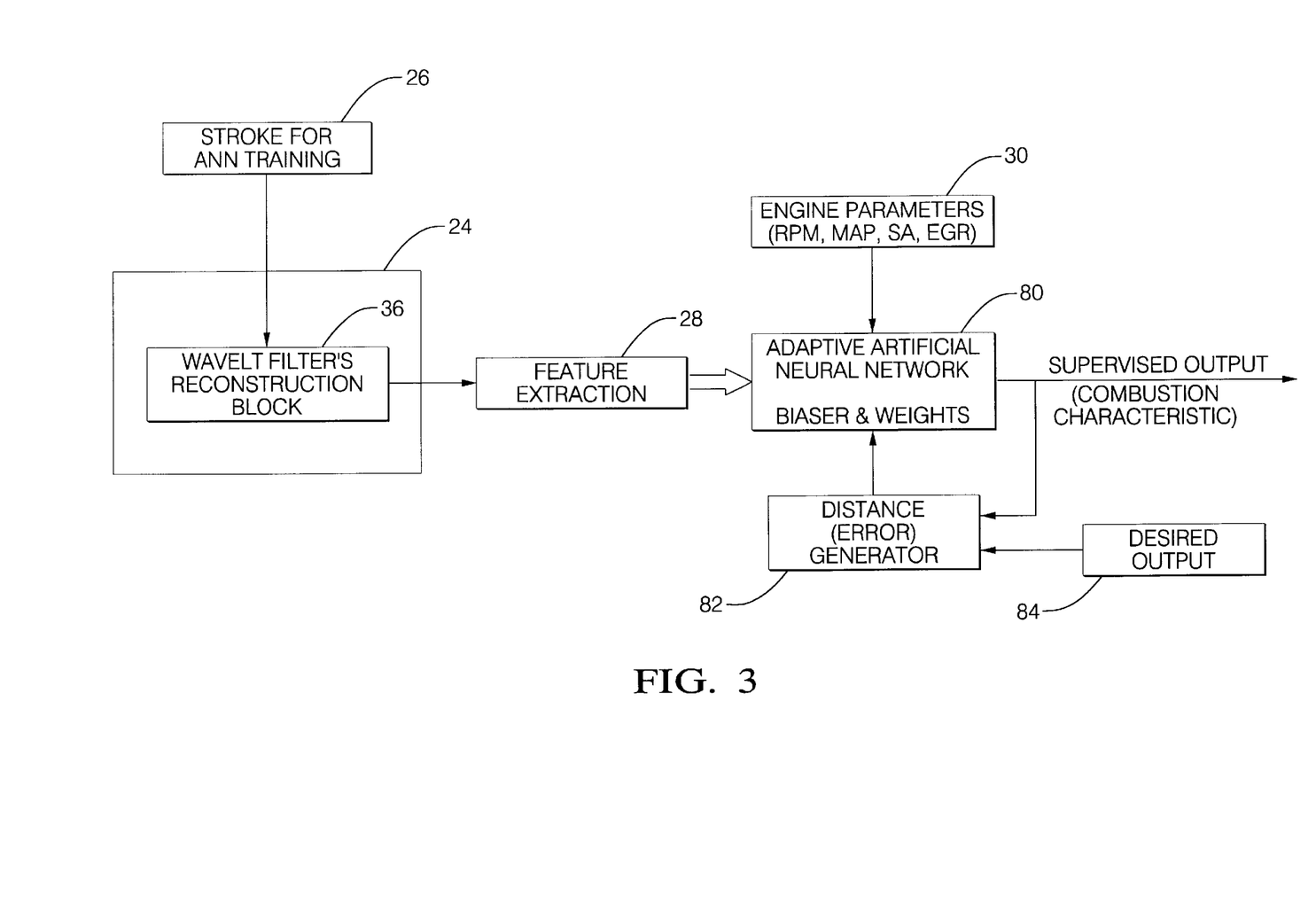
FIG. 3 is another functional block diagram, in accordance with the present invention.

Referring now to FIG. 3, a setup for training the ANN 60 is shown, which consists of bench training on pre-production engines and vehicles. The ANN 60 requires training using an adaptive ANN 80 during development, and implementation of the trained ANN in the controller 10. Training of the adaptive ANN 80 occurs to establish a relationship between the array of data inputs and a desired output 84, using at least one supervised learning algorithm in the preferred embodiment. To train the adaptive ANN 80 a set of training data is assembled which contains examples of the array of data inputs together with the corresponding desired output 84. The learning algorithm uses the training data to adjust coefficients and biases used by the equations of the adaptive ANN 80 to minimize the error in its predictions on the training data. When the adaptive ANN 80 is properly trained it creates a series of inferred relationships that relate the array of data inputs to the output. The ANN 60 is implemented using the coefficients and biases developed by the adaptive ANN 80. Successful implementation of the ANN 60 requires knowledge of how to select and prepare input data and output data, how to select an appropriate neural network, and how to assess and interpret results. When implemented, the ANN 60 has fixed coefficients and biases for the equations based upon values developed by the learning algorithm during training. Use of an ANN is known to one skilled in the art.

Referring again to FIG. 3, a setup for training the adaptive ANN 80 is shown, which consists of bench training on pre-production engines and vehicles (not shown). The training setup includes the adaptive ANN 80 with a learning algorithm and internal equations, each with the aforementioned adjustable coefficients and biases. There is also an error generator 82. Inputs to the adaptive ANN 80 comprise the extracted critical signal feature that is output from block 28, the specific engine parameters 30, and an error signal from the error generator 82.

One input to the adaptive ANN 80 comprises the extracted critical signal feature. The extracted critical signal feature is output from block 28 and comprises the data sample that has passed through the decomposition portion 34 of the wavelet filter and been compressed and stored as described previously, and shown in block 26 (FIG. 2). The compressed data sample is reconstructed, as shown in block 36, and the features are extracted, as shown in block 28. The critical signal feature is input to the adaptive ANN 80. The input also includes corresponding specific engine parameters 30, comprising engine speed, engine load, spark advance and EGR fraction, as described previously. The output of the adaptive ANN 80 is described as a supervised output.

The inputs to the error generator 82 comprise the supervised output of the adaptive ANN 80 and a desired output 84, which is an external measure of the desired combustion characteristic. The error generator 82 calculates a difference between the supervised output and the desired output 84. The output of the error generator 82 becomes an input to the adaptive ANN 80.

Analog training data, comprised of the ionization signal, specific engine parameters, and a signal representing the desired output 84, is collected using engines and vehicles operating under specific test conditions that preferably have been created based upon a designed experiment. The signal representing the desired output 84 is comprised of an output of a wide range air/fuel ratio sensor (not shown) when the combustion characteristic for control is air/fuel ratio. The signal representing the desired output 84 is comprised of a measure of cylinder pressure when the combustion characteristic for control is the location of peak pressure.

The analog training data is processed through the analog data sampler 20. The ionization data sample is passed through the decomposition segment 34 of the wavelet filter 24 and compressed and stored for ANN training, as shown in block 26. A complete data set includes an output of the decomposition element 34 of the wavelet filter 24, the desired output 84, and associated engine operating parameters 30 that are captured concurrently using the sampling and processing scheduler 22. A file containing the ionization signal and specific engine parameters and the specific desired output 84 is compressed and stored digitally. The collected data is input to the adaptive ANN 80, which in turn generates a supervised output 86. The desired output 84 and the supervised output 86 represent the specific combustion characteristic that the ANN is being trained to identify and quantify. The error generator compares the supervised output 86 to the desired output 84 and an error signal is generated which is input to the adaptive ANN 80. The adaptive ANN 80 changes the specific coefficients and biases of the internal equations, until the desired output 84 matches the supervised output for the specific set of operating conditions. This process is repeated using all the data collected to train the adaptive ANN 80. The coefficients and biases created using the adaptive ANN 80 are captured and stored for use by the ANN 32 in a production implementation of the ANN 32. The training and use of an ANN is well known to one skilled in the art.

The controller 10 uses the ANN 60 to predict an output based upon real-time data inputs that are gathered during each engine combustion event. An output of the artificial neural net 32 is a combustion characteristic of the engine, which is used by the controller 10 to control the engine 5. It can be an air/fuel ratio, or a location of peak pressure, or other combustion characteristic that is correlated to engine performance. The neural network in this embodiment was implemented using Simulink, DSP Blockset, and Neural Network toolboxes from Mathworks, Inc. ANNs are generally known to one skilled in the art.

To extract air/fuel ratio information, the sampling and processing scheduler 22 causes the analog data sampler 20 to sample the ionization signal during the initial, flame-phase of the combustion process, which occurs 10–30 degrees after start of spark event. This is shown in FIG. 4 as item 120. The sampled ionization signal becomes an input into the wavelet filter for extraction of the critical signal feature, which is an integral of the flame phase and peak magnitude of the ionization signal. The extracted critical signal feature from the feature extractor 28 is then combined with the specific engine operating parameters 30 for input to the ANN 32. The output of the ANN is a real-time measure of air/fuel ratio that is input to the controller 10 and able to be used by other engine management algorithms.

To extract information regarding a location of peak pressure, the sampling and processing scheduler 22 causes the analog data sampler 20 to sample the ionization signal during the post-phase of the combustion process, which typically occurs 20–50 degrees after start of spark event. This is shown in FIG. 4 as item 140. The sampled ionization signal becomes an input into the wavelet filter for extraction of the critical signal feature, which is the relative time of the post-combustion ion peak of the ionization signal. The extracted critical signal feature from the feature extractor 28 is then combined with the specific engine operating parameters 30 for input to the ANN 32. The output of the ANN is a real-time measure of a location of peak pressure that is input to the controller 10 for control of the engine 5, and may also be used by other engine management control algorithms.

Although this is described as a method and system for controlling an internal combustion engine by determining a combustion characteristic from an ionization signal using a wavelet filter and an ANN, it is understood that an alternate embodiment of this invention includes the use of the combustion characteristic to detect engine and component malfunctions and diagnose failure modes of the engine or components.

It is also understood that the invention applies to the detection of other critical signal features that can be extracted from the ionization data sample, using other wavelet transforms.

It is also understood that the determined combustion characteristic can include other combustion characteristics, for example a percentage of mass fraction burned, NOx content, and EGR mass-fraction dilution.

Although the preferred embodiment describes as a method and system for controlling an conventional control system for an internal combustion engine, it is understood that the invention can be implemented in conjunction with other engine control systems such as lean-burn systems, direct-injection fuel systems, cylinder deactivation systems, among others.

Although described as a system for use in control of a spark-ignition internal combustion engine, it is understood that this invention applies equally to other forms of internal combustion engines wherein an ionization signal may be detected in the combustion chamber. Alternative engines that are included in this invention include, for example, compression ignition engines and homogeneous charge combustion ignition engines. When the invention is applied to a compression-ignition engine, the ionization sensor can comprise a glow plug that is operably connected to an ion-sense ignition module 12 that is integral to the controller.

It is also understood that the invention encompasses an internal combustion engine, regardless of the specific application. Some typical applications can include, for example, automobiles, trucks, boats, ships, agricultural tractors, construction equipment, stationary engines, motorcycles, racing vehicles, and others.

It is also understood that although the data analysis is described using algorithms executed in an electronic controller, the invention also covers data analysis that is accomplished using other means, for example, electronic digital signal processing (DSP) chips. It also encompasses data analysis that is accomplished using a combination of algorithms and electronic chips and circuits.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. A method for controlling an internal combustion engine, comprising
    determining a combustion characteristic of an individual combustion event of the engine by:
        concurrently sampling an ionization signal and determining at least one engine operating parameter during a combustion event of the internal combustion engine,
        transforming the ionization signal with a wavelet filter,
        extracting at least one critical signal feature from the ionization signal that has been transformed by the wavelet filter; and
        processing the at least one critical signal feature and the at least one engine operating parameter through an artificial neural network; and
    controlling the internal combustion engine based upon the combustion characteristic.

2. The method of claim 1, wherein determining a combustion characteristic of an individual combustion event of the engine occurs each combustion event.

3. The method of claim 1, wherein transforming the ionization signal with a wavelet filter comprises:
    tuning the wavelet filter to the at least one critical signal feature;
    decomposing the ionization signal using the tuned wavelet filter; and
    reconstructing the decomposed ionization signal.

4. The method of claim 3, wherein the at least one critical signal feature comprises a location of a second peak ionization value after an ignition event relative to the rotation of the crankshaft of the engine.

5. The method of claim 4, wherein extracting at least one critical signal feature from the ionization signal that has been transformed by the wavelet filter comprises determining a specific location of the second peak ionization value after the ignition event relative to the rotation of the crankshaft of the engine.

6. The method of claim 5, wherein determining a combustion characteristic of the engine comprises using the artificial neural network to determine a magnitude of engine torque based upon the specific location of the second peak ionization value after the ignition event relative to the rotation of the crankshaft of the engine.

7. The method of claim 6, wherein controlling the internal combustion engine based upon the combustion characteristic comprises controlling at least one output device of the engine based upon the magnitude of engine torque.

8. The method of claim 1, wherein concurrently sampling an ionization signal and at least one engine parameter during a combustion event of the internal combustion engine comprises sampling during a critical period of time after an ignition event.

9. The method of claim 1, wherein concurrently sampling an ionization signal and at least one engine parameter during a combustion event comprises using a sampling and processing scheduler to activate an analog data sampler during a time when the critical signal feature is present in the ionization signal.

10. The method of claim 3, wherein the at least one critical signal feature comprises a curve containing a first peak ionization value after an ignition event.

11. The method of claim 10, wherein extracting at least one critical signal feature from the ionization signal that has been transformed by the wavelet filter comprises determining a time-integral of the curve containing the first peak ionization value of after the ignition event.

12. The method of claim 11, wherein determining a combustion characteristic of the engine comprises using the artificial neural network to determine an air/fuel ratio based upon the magnitude of the time-integral of the curve containing the first peak ionization value after the ignition event.

13. The method of claim 12, wherein controlling the internal combustion engine based upon the combustion characteristic comprises controlling at least one output device of the engine based upon the air/fuel ratio.

14. The method of claim 1, wherein determining at least one engine operating parameter during a combustion event of the internal combustion engine comprises determining an engine load, a spark advance, an amount of delivered fuel and a mass fraction of EGR delivered.

15. The method of claim 1, wherein processing the at least one critical signal feature and the at least one engine operating parameter through an artificial neural network comprises
    gathering data to train the artificial neural network;
    training the artificial neural network using the gathered data;
    implementing the trained artificial neural network as at least one algorithm in the controller.

16. The method of claim 1, wherein processing the at least one critical signal feature and the at least one engine operating parameter through an artificial neural network comprises
    gathering data from the ionization signal to train the artificial neural network;
    compressing the gathered data for storage;
    decompressing the gathered data that has been stored;
    training the artificial neural network using the decompressed data;
    implementing the trained artificial neural network as at least one algorithm in the controller.

17. A method for determining a combustion characteristic of an internal combustion engine, comprising
    concurrently sampling an ionization signal and determining at least one engine operating parameter during a combustion event;
    transforming the ionization signal with a wavelet filter;
    extracting at least one critical signal feature from the ionization signal that has been transformed by the wavelet filter; and processing the at least one critical signal feature and the at least one engine operating parameter through an artificial neural network.

18. A system to control an internal combustion engine, comprising controller operably connected to:
- at least one output device of the internal combustion engine,
- at least one ion sensor operable to measure an ionization signal from a combustion event of the internal combustion engine, and
- at least one engine sensor operable to measure at least one engine operating parameter;
- wherein said controller is operable to:
  - concurrently sample an ionization signal using the at least one ion sensor and determine at least one engine operating parameter using the at least one engine sensor during a combustion event,
  - transform the ionization signal with a wavelet filter,
  - extract at least one critical signal feature from the ionization signal that has been transformed by the wavelet filter, and
  - process the at least one critical signal feature and the at least one engine operating parameter through an artificial neural network to determine at least one combustion characteristic of the engine; and
- wherein the controller controls the at least one output device of the internal combustion engine based upon the at least one combustion characteristic of the engine.

19. The system of claim 18, wherein having the controller control the at least one output device of the internal combustion engine based upon the at least one combustion characteristic comprises controlling engine torque.

20. The system of claim 18, wherein the internal combustion engine comprises a compression-ignition engine.

21. The system of claim 18, wherein the internal combustion engine comprises a spark-ignition engine.

22. The system of claim 18, wherein the internal combustion engine comprises a homogeneous charge compression-ignition engine.

23. A system to determine a combustion characteristic of an internal combustion engine, comprising:
- a controller operably connected to:
  - at least one output device of the internal combustion engine,
  - at least one ion sensor operable to measure an ionization signal from a combustion event of the internal combustion engine, and
- at least one engine sensor operable to measure at least one engine operating parameter;
- wherein said controller is operable to:
  - concurrently sample an ionization signal using the at least one ion sensor and determine at least one engine operating parameter using the at least one engine sensor during a combustion event,
  - transform the ionization signal with a wavelet filter,
  - extract at least one critical signal feature from the ionization signal that has been transformed by the wavelet filter, and
  - process the at least one critical signal feature and the at least one engine operating parameter through an artificial neural network.

* * * * *